US006694593B1

(12) United States Patent
Causse D'Agraives et al.

(10) Patent No.: US 6,694,593 B1
(45) Date of Patent: Feb. 24, 2004

(54) METHOD FOR MAKING IDENTITY CORES FOR ULTRASOUND SEALS

(75) Inventors: Bertrand Causse D'Agraives, Laveno (IT); Jan Toornvliet, deceased, late of Rotterdam (NL), by Ilia Toornvliet, Tamars Toornvliet, Peter Toornvliet, legal representatives; Ermanno Mascetti, Germignaga (IT); Pier Carlo Tebaldi, Brebbia (IT)

(73) Assignee: European Community (EC) (LU)

( * ) Notice: Subject to any disclaimer, the term of this patent is extended or adjusted under 35 U.S.C. 154(b) by 0 days.

(21) Appl. No.: 09/530,354

(22) PCT Filed: Dec. 21, 1998

(86) PCT No.: PCT/EP98/08385

§ 371 (c)(1), (2), (4) Date: May 17, 2002

(87) PCT Pub. No.: WO99/33045

PCT Pub. Date: Jul. 1, 1999

(30) Foreign Application Priority Data

Dec. 22, 1997 (LU) ................................................ 90187

(51) Int. Cl.[7] .......................... B23P 21/00; B23P 11/00; B23P 17/00

(52) U.S. Cl. ......................... 29/469; 29/428; 29/525.14

(58) Field of Search ..................... 29/469, 428, 525.14; 411/2–4, 14, 910; 73/761, 760, 763

(56) References Cited

U.S. PATENT DOCUMENTS 5,228,250 A * 7/1993 Kesselman ..................... 52/98
5,807,048 A * 9/1998 d'Agraives et al. ............ 411/2

* cited by examiner

*Primary Examiner*—John O. Hong
(74) *Attorney, Agent, or Firm*—Sughrue Mion, PLLC

(57) ABSTRACT

The invention concerns a method for making identity cores for ultrasound seals. Each core comprises a chip consisting of a brazed stack of metal disks 1 bearing at least one notch 3, the resulting identity being defined by the number, the size and the random angular position of the various notches in the stack and by the unpredictability of the brazing. The invention is characterized in that the notched disks 1 provided with a central hole 2 are first stacked in large numbers in a tubular metal sheath 4 with a circular cross-section corresponding to said disks 1. The stack is then axially compressed in the sheath 4 and a brazing bead 7 is inserted in the channel constituted by the assembly of aligned central holes 2. After brazing in a vacuum oven, the two ends of the sheath are eliminated and the resulting column is segmented perpendicularly to its axis into a series of individual identity chips 8 of predetermined thickness. Such a chip is finally associated by brazing with a metal block 13 used as delay line to constitute the core. Identity control can be combined with integrity control by associating an integrity rod 10 to 12 with said block 13, whereby with one reading both identity and integrity can be ascertained.

5 Claims, 2 Drawing Sheets

METHOD FOR MAKING IDENTITY CORES FOR ULTRASOUND SEALS

BACKGROUND OF THE INVENTION

The present invention refers to a method of making identity cores for ultrasound seals, each core comprising a brazed stack of disks each presenting at least one notch, the identity being at least in part defined by the random angular position of the various notches in the stack of disks.

Such a core is described in the patent document EP 0 638 250 A.

These cores are intended for being incorporated in seals or markers for controlling and handling dangerous materials, especially radioactive materials, in order to allow their control and to contend with frauds.

According to the terms of the Nuclear Non-Proliferation Treaty, any transport or storage of radioactive materials should be subjected to a permanent control by international inspectors. In order to comply with their mission the inspectors should be able to seal recipients and to verify the identity and integrity of such seals.

In the above cited documents bolts are described which insure locking of a recipient and which are supplied with an identity core. By applying an ultrasound reader to the head of the bolt, the identity can be read, and simultaneously it can be verified if the bolt has been manipulated since the most recent prior verification.

It is known to make use of random phenomena for the definition of the identity in order to avoid any fraudulent tentative to copy a seal. Thus the document cited above proposes to make identity cores by stacking a certain number of notched disks in such a way that, after a convenient assembly of the stack by soldering, the identity is defined at least in part by the random position of the notches in the stack, that means by the cavities which after soldering generate ultrasound echoes. The identity is thus defined after soldering a random assembly of disks to become one block, the random nature being based on their individual fabrication.

SUMMARY OF THE INVENTION

These cores may be combined with an integrity rod having a zone of preferred breaking in case of an integrity violation. By applying an ultrasound reader to a bolt incorporating such a core, the ultrasound response which is registered corresponds on the one hand to the identity of this seal and on the other hand, through the integrity status of the rod, to the integrity status of the bolt.

The present invention concerns the method for making identity cores which are intended to be used in such seals or others. In fact, it has been noted that the individual manufacturing of the cores is complex due to the large number of required cores (after each opening of a recipient a new core is necessary) and due to the small size of the cores (12 mm in diameter, 5 mm in height) and especially due to the quality requirements. For example, an absolute plane surface of the disks must be ensured, the thickness of a disk being in the range of one millimeter.

The method according to the invention is defined by the attached claims.

BRIEF DESCRIPTION OF THE DRAWINGS

The invention will now be described in more detail by means of a preferred embodiment and the attached drawings.

DETAILED DESCRIPTION OF THE INVENTION

Figure 1:
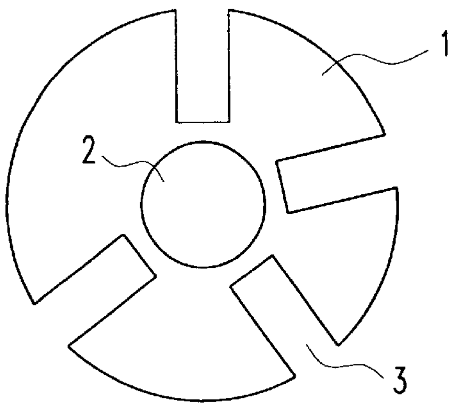
FIG. 1 shows a disk which is part of the core made according to the invention.

FIG. 1 shows from above a disk made of metal sheet. Several such disks make up an identity core. According to this embodiment each disk 1 of substantially circular shape and of a thickness of 1 mm comprises a central hole 2 (diameter 3.6 mm), and laterally at least one notch 3 which extends radially from the periphery towards a point close to the border of the central hole 2. The width of this notch is for example 1.5 mm. Such disks can be realised by stamping. It should however be ensured that these disks have perfectly plane surfaces and no beards.

If disks of a unique thickness having only one notch were used, then the variety of obtainable identity cores would be rather small. However, this variety can be increased at constant detection quality by providing two, three or even four notches and/or by providing disks of various thicknesses, the different types of disks being then randomly combined. The angle between two adjacent notches should be large enough in order not to weaken unduly the mechanical stability of the disks. This angle should for example be larger than 40°, preferably larger than 60°.

Here-under cores will be described which are composed of disks having various thicknesses between 0.9 and 1.3 mm, but the invention is not limited by these figures.

Figure 2:
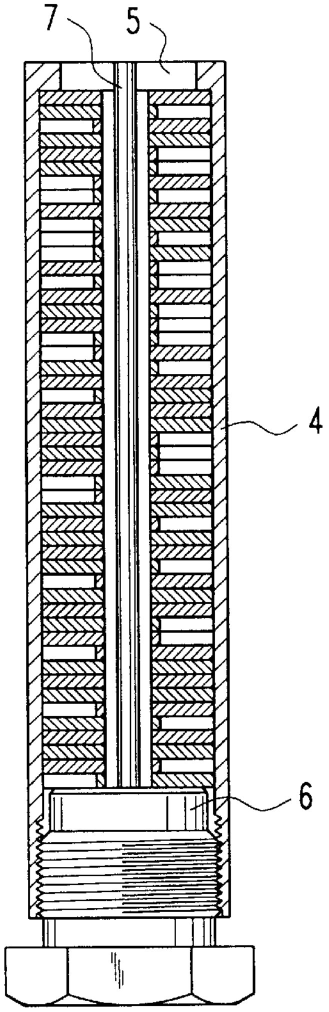
FIG. 2 shows an axial section through a stack of disks ready for soldering in the frame of the method according to the invention.

After the manufacture of the disks by stamping, disks are stacked in large number without pre-established order in a tubular sleeve 4 as shown in FIG. 2. The sleeve presents at one end a hole 5 and can be obturated at the other end by a threaded plug 6. The dimensions of this sleeve 4 are selected in such a way that its inner volume can be filled by a given number of disks, for example 50 disks, and that this stack can be compressed by fastening the plug 6.

Thereafter, a solder material stick 7 is inserted through the hole 5 of the sleeve into the central channel composed from the central holes 2 of all the disks.

All the components (sleeve, plug, disks) should have a perfect surface quality prior to the assembling.

After having received a compressed stack of disks and a soldering stick, the sleeve is entered into an oven. As known form the state of the art, the interior of the oven can be subjected to a vacuum and/or to an inert atmosphere. Moreover, the increase and decrease of the temperature can be programmed according to the necessities.

During this soldering phase, the solder material penetrates by moistening into all the metal-metal interfaces and moistens all the walls, even those of the cavities constituted be the notches 3 of the disks. As the case may be, a small quantity of soldering material could bind a residual particle at the wall thus causing the creation of an additional random factor. After the soldering phase the disks are secured one with respect to the others in a random angular position and make up a compact block.

After withdrawal from the oven the bottom of the sleeve and the plug are eliminated, for example on a lathe, and the remaining column is divided perpendicularly to its axis into a series of chips of predetermined thickness, this cutting being for example achieved by electro-erosion.

Figure 3:
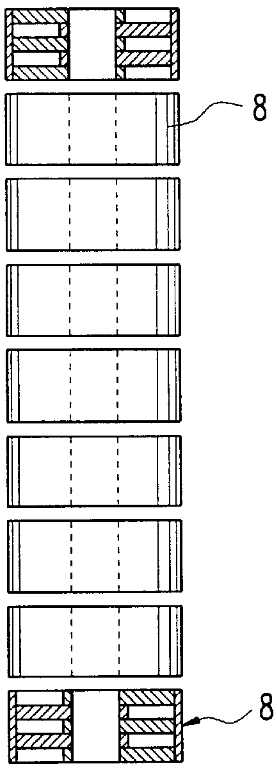
FIG. 3 shows a step subsequent to the soldering, that means the step of subdividing the stack into individual chips.
Figure 4:
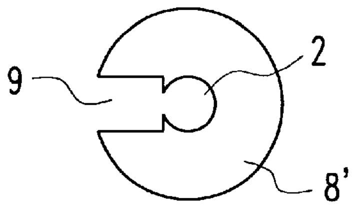
FIG. 4 shows such a chip from above which has been modified in view of a combination with an integrity rod.
Figure 5:
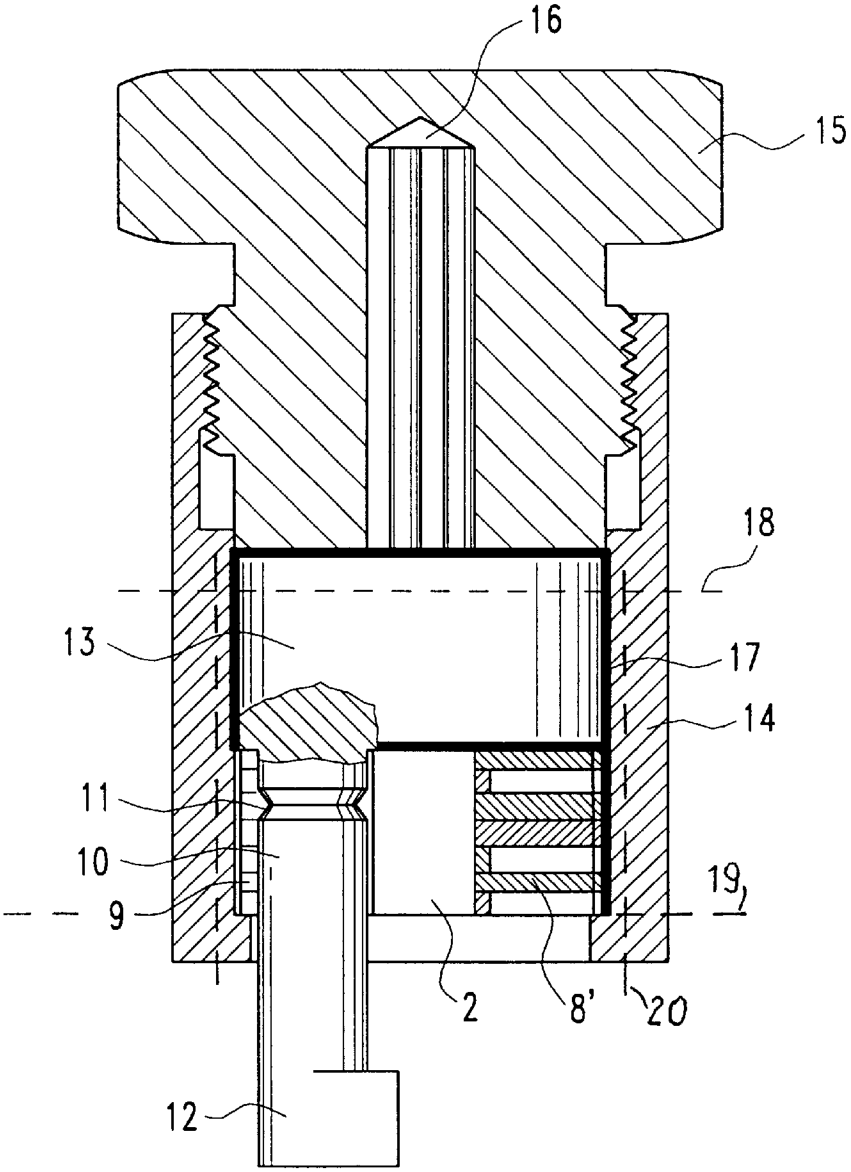
FIG. 5 shows a cut view through the combination of a core as modified according to FIG. 4 and an integrity rod during the soldering of these two elements.

FIG. 3 shows this column according to an axial cut view after its subdivision into nine chips such as chip 8. The hight of each chip is 5.2 mm. The cutting planes are randomly located with reference to the interface between two disks. Each disk presents an individual identity which depends on the angular position of the metal disks which it contains, this identity being detectable by an ultrasonic reader scanning along a circular path of intermediate diameter between that of the hole 2 of the disks and the periphery of the chip. By this means, such a chip constitutes in combination with a delay line 13 (see FIG. 5) an identity core which can be incorporated by mounting or soldering means into a bolt which for example safely seals a barrel filled with radioactive waste, the random character of the structure of the core ensuring the protection against copying.

If besides the identification function a seal or a barrel or other object to be controlled must also be protected against a non-authorized manipulation, the core should be combined with an integrity rod which breaks during such a manipulation. To this end a groove is cut along a generatrix line of the soldered column as shown in FIG. 2. After the subdivision into chips each chip 8' as modified presents with respect to chip 8 in FIG. 3 an additional, open notch 9.

This notch 9 receives freely an integrity rod 10 which is an extension of the metal block 13, the latter acting as a delay line for ultrasound waves after having been soldered to the identity chip 8'. The integrity rod 10 presents a portion 11 of reduced cross section for privileged breaking which will break if a traction, torsion or shear force (or a combination of these forces) is applied. This rod is connected in the final assembly by its anchoring tail 12 to a mechanical element (not shown) inside the bolt to be protected.

The block 13 (delay line) with its integrity rod 10, as the case may be, is inserted into a soldering sleeve similar to the soldering sleeve 4. The plug 15 of this sleeve comprises a central cavity 16 for receiving a solder material stick. It can be threaded into the sleeve in order to compress the block 13 and the identity chip 8 or 8' underneath. This assembly is soldered according to a method similar to that which had been described in accordance with FIG. 2. However, this time the soldering will no more penetrate into the stack but simply secures together the chip 8 or 8' and the block 13 with the sleeve 14. It should be avoided here by classical means such a hydrophobic product that the solder material penetrates into the space between the wall of the notch 9 and the rod 10. The surfaces moistened by the solder material are marked by a fatty line 17.

The last step of making this combined identification and integrity core consists in separating the head of the sleeve with the plug 15 from the rest by cutting perpendicularly to the axis of the core along a line 18 at the upper level of the block 13 corresponding to the exactly desired thickness for the delay line. In the same way the portions of the sleeve 14 which have become useless are withdrawn, on the one hand by cutting along a line 19 perpendicularly to the axis at the lower level of the chip 8' and on the other hand by reducing the diameter of the sleeve down to a cylinder 20 thus retaining only a sheath of about 1 mm thickness around the assembly consisting of the block 13 and the chip 8'. The surface for reading the identity and integrity state of the seal is then constituted by the cut surface 18. By moving a read head along a circular line coaxial to the core and situated half-way between the central hole 2 and the periphery of the core, a response is obtained which for at least 80% of the circular path contains informations relating to the identity of the core and for the rest informations concerning the integrity of the rod. These two types of response are clearly differentiated mutually due to the presence of the integrity rod in the additional notch 9, said rod reflecting, contrary to the notches 3 in the disks, no echoes as long as it is not broken.

The invention is not limited to the embodiments as described above in detail. In particular, the identity core can be applied alone for simply defining in an unambiguous manner the identity of an object to which it is associated or incorporated.

In addition, it is clear that the size and shape indications supplied above only serve to illustrate an embodiment and can be modified if necessary without escaping from the scope of the attached claims. As far as the materials are concerned which are used especially for the disks and the solder and as far as the temperature and treatment time for the soldering are concerned, reference is made to the abundant literature in this field.

What is claimed is:

1. A method of making identity cores for ultrasound seals, each core consisting of a delay line and a soldered stack of metal disks each presenting at least one notch, the identity being defined by a random angular position of different notches in the stack, characterized in that many notched disks each comprising a central hole are firstly stacked in a tubular metal sleeve of circular inner cross-section corresponding to the size of the disks, the stack is axially compressed in the sleeve and a soldering stick is introduced into a channel constituted by an assembly of the central holes which are aligned, a soldering is performed in a vacuum oven, after elimination of two end portions of the sleeve, a column obtained in this way is cut perpendicularly to its axis into a plurality of individual identity chips of predetermined thickness, and said core is obtained by soldering to such a chip a metal block which acts as delay line.

2. A method according to claim 1, characterized in that the notches present an elongate shape and extend radially from the periphery of the disk towards a diameter which is slightly greater than the diameter of the central hole.

3. A method according to claim 1, characterized in that, the number of notches in a disk being greater than one, the angle between any two respective adjacent notches is at least equal to 40%.

4. An identity core made according to the method as defined in claim 1, characterized in that it is part of a soldered identity and integrity assembly and comprises an additional notch made after the soldering of the stack and extending over the entire thickness for permitting an integrity rod to pass therethrough which is part of the metal block and presents a zone of privileged breaking if the integrity is violated, this violation being detectable by ultrasound waves during a read-out operation of the core identity.

5. A method according to claim 1, characterized in that, the number of notches in a disk being greater than one, the angle between any two respective adjacent notches is at least equal to 60%.

* * * * *